(12) United States Patent
Gehrmann (10) Patent No.: US 7,702,910 B2
(45) Date of Patent: Apr. 20, 2010

(54) MESSAGE AUTHENTICATION

(75) Inventor: Christian Gehrmann, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1320 days.

(21) Appl. No.: 10/602,167

(22) Filed: Jun. 24, 2003

(65) Prior Publication Data

US 2005/0262418 A1    Nov. 24, 2005

Related U.S. Application Data

(60) Provisional application No. 60/420,964, filed on Oct. 24, 2002.

(51) Int. Cl.
  *H04L 9/32* (2006.01)
(52) U.S. Cl. .................. 713/181; 713/170; 714/758; 709/227
(58) Field of Classification Search ........... 713/181, 713/166, 170, 169, 171; 714/758, 21, 52, 714/762; 360/48, 49, 53; 709/227
See application file for complete search history.

(56) References Cited

U.S. PATENT DOCUMENTS

| | | | | |
|---|---|---|---|---|
| 4,200,770 | A | | 4/1980 | Hellman et al. ............ 178/22 |
| 4,688,250 | A | * | 8/1987 | Corrington et al. ......... 713/170 |
| 5,651,069 | A | | 7/1997 | Rogaway ................... 380/28 |
| 5,664,016 | A | | 9/1997 | Preneel et al. ............. 380/28 |
| 6,348,875 | B1 | | 2/2002 | Odinak et al. ........... 340/825.52 |
| 6,631,172 | B1 | * | 10/2003 | Shokrollahi et al. ........ 375/340 |
| 6,718,503 | B1 | * | 4/2004 | Lerner et al. ............. 714/755 |
| 6,845,449 | B1 | * | 1/2005 | Carman et al. ............ 713/170 |
| 6,851,052 | B1 | * | 2/2005 | Graveman ................. 713/168 |

FOREIGN PATENT DOCUMENTS

| | | | |
|---|---|---|---|
| EP | 1255372 | A1 | 5/2001 |
| EP | 1257084 | A1 | 11/2001 |
| WO | WO 00/51244 | | 8/2000 |
| WO | WO 01/01628 | | 1/2001 |
| WO | WO 01/11818 | A2 | 2/2001 |

OTHER PUBLICATIONS

Gehrmann et al.; *Enhancements to Bluetooth Baseband Security*, pp. 1-15.

(Continued)

*Primary Examiner*—Thanhnga B Truong
(74) *Attorney, Agent, or Firm*—Michael G. Cameron (57) ABSTRACT

A method of processing a message to determine a tag value from the message and from a key according to a message authentication code. The method including the steps of selecting one of a plurality of symbols, the plurality of symbols forming a codeword encoding a data item derived from the message, the codeword encoding the data item according to an error correcting code, wherein said key determines which one of said plurality of symbols is selected; and determining the tag value to be the selected symbol.

9 Claims, 3 Drawing Sheets

OTHER PUBLICATIONS

Kabatianskii et al: *On the Cardinality of Systematic Authentication Codes Via Error-Correcting Codes*, In IEEE Transactions On Information Theory, vol. 42, No. 2, Mar. 1996, pp. 566-578.

*Final Techinical Report—Specification of A Security Architecture for Distributed Terminals*, IST-2000-25350-SHAMAN; Nov. 2002, pp. 35-46 of 158.

Lam, et al.: *Message Authentication Codes With Error Correcting Capabilities*, In the International Conference on Information and Communication Security (ICICS), Singapore, Dec. 2002, pp. 1-16.

Gobioff et al.; *Integrity and Performance in Network Attached Storage*, In the Proceedings of the International Symposium on High Performance Computing (ISHPC 99), Tokyo, Japan, 199, pp. 1-22.

\* cited by examiner

| $\log_2|D|$ | $\log_2(n)$ | $P_s$ |
|---|---|---|
| 128 | 16 | $2^{-13} - 2^{-16}$ |
| 256 | 16 | $2^{-12} - 2^{-16}$ |
| 128 | 20 | $2^{-17} - 2^{-20}$ |
| 256 | 20 | $2^{-16} - 2^{-20}$ |

MESSAGE AUTHENTICATION

RELATED APPLICATION

This application claims the priority of U.S. Provisional Application No. 60/420,964 filed on Oct. 24, 2002, the disclosure of which is incorporated herein in its entirety by reference.

FIELD OF THE INVENTION

This invention relates to the processing of a message to determine a tag value according to a message authentication code.

BACKGROUND OF THE INVENTION

Data integrity and authenticity may be fundamental expectations in any secure data communications system, and they comprise an assurance that information has not been modified by someone who is not authorized to do so. In wireless communications scenarios there is a particularly high risk of an adversary intercepting and possibly modifying the communicated data and, thus, a particular need for integrity protection and authentication.

Data integrity may be provided by a Message Authentication Code (MAC). MACs are used for the integrity protection of data communications payload, since they provide a computationally efficient way of protecting even large amounts of data.

MACs are based on a symmetric shared secret between the sender and the receiver. The secret value is called the key. The secret key is one input variable to the MAC calculation and the message to be protected is another input. The MAC calculation results in an integrity check value which is referred to as a tag value. Only somebody who possesses the correct secret key is able to calculate the tag value for any given message. In conventional automatic integrity protection scenarios, the calculated tag value is appended to the message before transmitting the message and the tag value over the communications channel to the recipient. Upon receiving a message protected by a MAC, the receiver calculates a corresponding tag value on the basis of the received data and the shared secret key. If the calculated tag value is equal to the received tag value, the message is accepted as authentic. Examples of known MACs include the so-called Keyed-Hashing for Message Authentication (HMAC) algorithm which is based on cryptographic one-way hash functions such as the secure hash algorithm SHA-1 and the message-digest algorithm MD5.

In manual authentication schemes the calculated tag value is not necessarily appended to the transmitted message. In such a scheme, the tag value may be calculated by the device sending the message and by the device receiving the message. Subsequently, a user compares the calculated tag values or manually transfers a calculated tag value from one device to the other for comparison by that device. Similarly, in some applications, a MAC may be used to perform an integrity check of a data item which was generated by two different devices separately. Hence, in this scenario the data item is not transmitted from a sender to a receiver and, thus, the tag value need not be appended to the data before transmission.

The article "Enhancements to Bluetooth baseband security" by C. Gehrmann and K. Nyberg, Proceedings of Nordsec 2001, Copenhagen, November 2001, describes an example of such a manual authentication scheme of a Diffie-Hellman shared secret that was previously generated by two devices without ever communicating the shared secret via a communications link. The method is based on the assumption that, if a man-in-the-middle is present in the Diffie-Hellman key exchange, the established Diffie-Hellman keys will be different in the legitimate devices. According to this method the generated shared secret is authenticated by manually exchanging a secret key, calculating a tag value of a message authentication code from the generated shared secret and the secret key, and by manually comparing the generated tag values.

In such scenarios involving a user interaction it is desirable to keep the length of the tag value short, in order to make a comparison or a transfer of the tag value by a user feasible, i.e. in order to reduce the time necessary for such a manual comparison and to reduce the risk of errors.

G. Kabatianskii, B. Smeets and T Johansson, "On the cardinality of systematic A-codes via error correcting codes", IEEE Transaction on Information theory, vol. IT-42, pp. 566-578, 1996, describe the relation between message authentication codes and error correcting codes and disclose a MAC construction based on an error correcting code where the code is partitioned into equivalence classes such that all codewords that differ by a constant are replaced by a singular codeword, thereby generating a new code, the so-called factor code. The tag value is then calculated from a symbol of that factor code on the basis of two keys.

SUMMARY OF THE INVENTION

Some embodiments of the present invention provide a tag value of a message authentication code that provides a high level of forgery protection for small tag sizes and small key sizes.

Some embodiments include a method of processing a message to determine a tag value from the message and from a key according to a message authentication code. The method includes:

selecting one of a plurality of symbols, the plurality of symbols forming a codeword encoding a data item derived from the message, the codeword encoding the data item according to an error correcting code, wherein said key determines which one of said plurality of symbols is selected; and determining the tag value to be the selected symbol.

This method may provide a high level of forgery security even for small tag sizes and small key sizes. A computationally efficient MAC construction may also be provided by directly selecting the tag value as a symbol of a codeword of an error correcting code.

In some embodiments, the data item derived from the message is the message itself. Hence, the message is directly used as an input to the error correcting code.

In some other embodiments, the data item derived from the message is a hash value of a one-way hash function calculated from the message, thereby reducing the message size and allowing a further reduction of the size of the key and/or the tag value while maintaining the same level of security.

Security may thereby be based on an unconditional security of the MAC function rather than relying on computational security as is the case when hash functions with long hash codes are used as MAC functions.

The MAC construction described above and in the following may provide sufficiently low forgery probabilities even for short tag values and short keys, i.e. tags and keys having a length of less than 10-15 digits and/or characters and/or other symbols, e.g. 4-6 hexadecimal characters, so as to allow a user to communicate and/or compare the tag values.

As used herein, the term message is intended to comprise any digital data item the integrity and/or authenticity of which is to be verified. Examples of messages include data items sent from a sender to a receiver, e.g. via a wireless communications link, data items generated separately or in cooperation by different devices, and the like.

In some embodiments, at least a contribution to the message is communicated from a sender to a receiver via a first communications channel; and the tag value and, optionally, the key are communicated via a second communications channel separate from the first channel. In one embodiment, the second communications channel involves a user interaction.

For example, the entire message may be communicated or, in some embodiments, each device participating in the communication may generate a contribution to the final message and send the contribution to the respective other device. Both devices then generate the final message. In this case, one or more of the transmitted contributions and/or the final message may be verified by the method described above and in the following.

Further preferred embodiments are disclosed in the dependant claims.

It is noted that the features of the method described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

Embodiments of the present invention can be implemented in various ways including the method described above and in the following, a communications device, and further product means, each yielding one or more of the benefits and advantages described in connection with the first-mentioned method, and each having one or more embodiments corresponding to the embodiments described in connection with the first-mentioned method and disclosed in the dependant claims.

Some embodiments of the present invention also relate to a communications device for communicating data messages, the communications device comprising processing means adapted to determine a tag value from a message and from a key according to a message authentication code, the processing means being adapted to:

- select one of a plurality of symbols, the plurality of symbols forming a codeword encoding a data item derived from the message, the codeword encoding the data item according to an error correcting code, wherein said key determines which one of said plurality of symbols is selected; and
- determine the tag value to be the selected symbol.

The term communications device comprises any device comprising suitable circuitry for receiving and/or transmitting communications signals, e.g. radio communications signals, to facilitate data communication. Examples of such devices include portable radio communications equipment and other handheld or portable devices. The term portable radio communications equipment includes all equipment such as mobile telephones, pagers, communicators, i.e. electronic organisers, smart phones, personal digital assistants (PDAs), handheld computers, or the like.

Further examples of communications devices include stationary communications equipment, for example stationary computers or other electronic equipment including a wireless communications interface. In one embodiment, one of the devices may be a network device, e.g. an access point of a computer network providing wireless access to that computer network, e.g. a LAN.

The term processing means comprises any circuit and/or device suitably adapted to perform the above functions. In particular, the above term comprises general or special purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

DETAILED DESCRIPTION OF THE PREFERRED EMBODIMENTS

Figure 1:
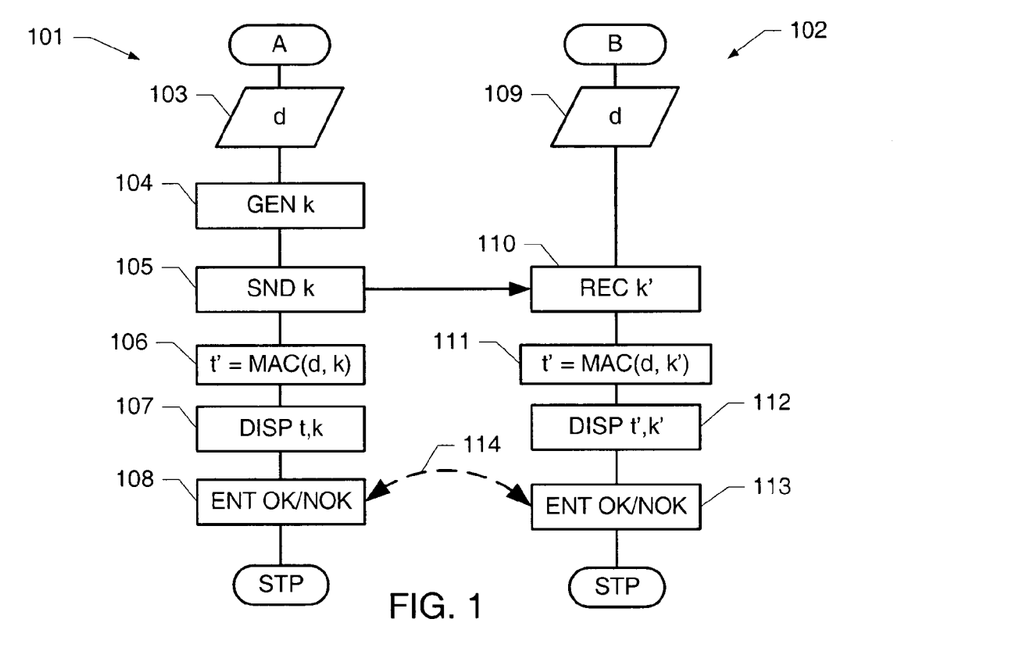
FIG. 1 shows a flow diagram of an example of a message authentication scenario involving user interaction.

FIG. 1 shows a flow diagram of an example of a message authentication scenario involving user interaction. The message authentication scenario involves two devices, generally designated A and B, respectively. The steps on the left side of the flow diagram, generally designated by reference numeral 101, are performed by device A, while the steps on the right side of the flow diagram, generally designated by reference numeral 102, are performed by device B.

In the example of FIG. 1, both devices have stored a message d as illustrated by boxes 103 and 109, respectively. For example, the message d may have been generated by one of the devices and sent to the other device; alternatively, both devices may have received the message d from one or more other devices, or they may have generated the message in cooperation with each other and/or with a third device.

In order to verify that both devices have stored the same message, in an initial step 104, device A generates a key k, e.g. a secret string of a suitable length and selected from a suitable key space. In step 105, device A sends the generated key to device B, e.g. via a wireless communications link or another suitable data connection between the two devices. In step 110, device B receives the key. In the following, the key received by device B will be referred to as k'.

In step 106, device A calculates a tag value t of a MAC function using the message d stored by device A and the key k generated by device A as inputs. Similarly, in step 111, device B calculates a corresponding tag value t' of the same MAC function as device A, using the received key k and the message d stored by device B as inputs.

In step 107 device A displays the calculated tag value t and the generated key k to the user of device A. Similarly, in step 112, device B displays the tag value t' calculated by device B and the received key k' to the user of device B. The user(s) compare the displayed values in order to determine whether they are equal, i.e. whether t=t'. For example, if the devices are in the vicinity of each other, a user may directly compare the displayed values. If the devices are located remotely from each other, a user of device A may read out the tag value t and the key k from device A, communicate the tag value and the key to a user of device B, e.g. by telephone or other communications means, such that the user of device B may perform the comparison with the tag value t' and the key k' displayed by device B.

In steps 108 and 114, the user(s) of devices A and B, respectively, enter the result of the above comparison, e.g. by pressing an OK-button, if the tag values and keys were equal, and a CANCEL button, if the values were not equal.

It is understood that various alternative embodiments of a user input of the result of the authentication may be implemented. For example, the user may only be required to enter the result into one of the devices. In yet another embodiment, the devices may assume that the authentication was not successful, if the user does not press the OK button within a predetermined time period.

If the tag values and keys are equal, the message d stored in the two devices is successfully authenticated, and devices A and B may continue their respective processing of the message. Hence, the authentication scenario of FIG. 1 involves a user interaction as indicated by the dashed arrow 114, since the user compares the displayed values and indicates the result of the comparison to the devices.

Figure 2:
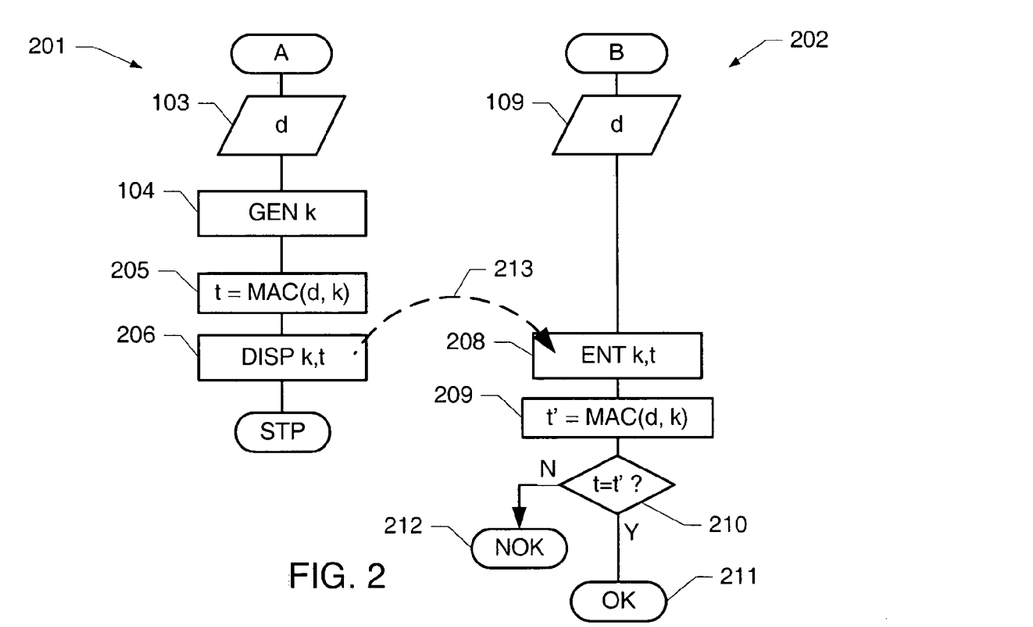
FIG. 2 shows a flow diagram of another example of a message authentication scenario involving user interaction.

FIG. 2 shows a flow diagram of another example of a message authentication scenario involving user interaction. Again, the message authentication scenario involves two devices A and B, respectively, and the steps on the left side of the flow diagram, generally designated by reference numeral 201, are performed by device A, while the steps on the right side of the flow diagram, generally designated by reference numeral 202, are performed by device B.

As in the above example, both devices have stored a message d as illustrated by boxes 103 and 109, respectively. In order to verify that both devices have stored the same message, in an initial step 104 device A generates a key k.

In step 205, device A calculates a tag value t of a MAC function using the message d stored by device A and the key k generated by device A as inputs.

In step 206, device A displays the generated key k and the calculated tag value t to the user of device A. For example, the values may be displayed as two separate values or concatenated into a single string.

The user of device A reads out the displayed value(s) and enters it into device B (step 208). For example, the user may enter the values via a keyboard or keypad of device B, or via any other suitable input device. It is understood that, e.g. if the devices are located remotely from each other, the user of device A may communicate the value(s) to a user of device B, e.g. by telephone or other communications means, such that the user of device B may enter the values into device B.

In subsequent step 209, device B calculates the tag value t' of the same MAC function as device A, using the entered key k and the message d stored by device B as inputs.

In step 210, device B compares the calculated tag value t' with the tag value t entered by the user of device B. If the tag values are equal, the message d is authenticated successfully (step 211); otherwise the message d is rejected as corrupted (step 212). In one embodiment, the device B may display a corresponding message to the user of device, indicating the result of the authentication. Alternatively or additionally, device B may send a corresponding message to device A.

Again, the authentication scenario of FIG. 2 involves a user interaction as indicated by the dashed arrow 213.

Hence, in the above, two examples of authentication scenarios that involve a user interaction are described. In the above scenarios, at least one of the key k input to the MAC function and the tag value t calculated by the MAC function are read out and/or entered by a user. The user may even be required to communicate the values to another user, e.g. via telephone. Hence, in the above and similar scenarios, it is desirable to keep the size of the tag value and the key short without reducing the security provided by the authentication scheme.

It is further understood that the scenarios described above merely serve as examples, and that there are numerous other authentication schemes involving user interaction. For example, in one embodiment, the key k may be generated by a third device and communicated to the devices A and B, or the key may be generated by the user, e.g. as a PIN number, and input into both devices, or the key may be hard-coded into the two devices, or the like. Furthermore, the key and, possibly, the tag value may be calculated by device A long in advance of the actual authentication. For example, device A may generate the key and the tag value in connection with the generation of the message d by device A. In yet another embodiment, the communicated parameters, i.e. the key k in FIG. 1 or the key and the tag in FIG. 2, may be communicated from device A to a third device from which it may be accessed by device B. For example, if B is a network device of a computer network, the above parameters may be communicated to another computer of the computer network where they may be stored and subsequently retrieved by device B.

Figures 3, 4B:
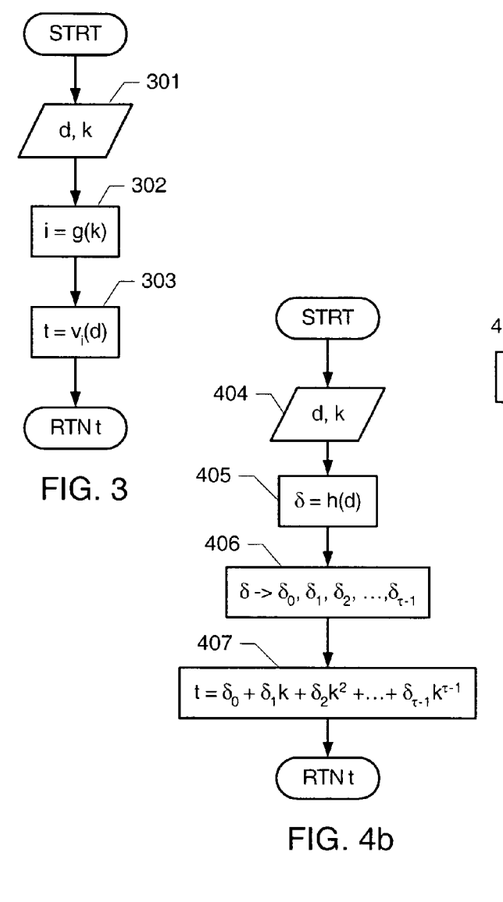
FIG. 3 illustrates a flow diagram of a method of calculating a message authentication code based on an error correcting code.
FIGS. 4a-b illustrate flow diagrams of examples of a method of calculating a message authentication code based on a Reed-Solomon code.

FIG. 3 illustrates a flow diagram of a method of calculating a message authentication code based on an error correcting code. In the example of FIG. 3, it is assumed that a data item d from a data space D is to be authenticated using a message authentication code (MAC), e.g. as in the steps 106 and 111 of FIG. 1 or in steps 205 and 209 of FIG. 2. For the purpose of this example, the data item d will also be referred to as message. e In general, a MAC is a mapping f from a data space D and a key space K to a tag space C, i.e. f: $D \times K \rightarrow C$ where a message $d \in D$ and a key $k \in K$ is mapped to a tag $t \in C$, i.e. $(d,k) \rightarrow t$.

A MAC is used to protect the integrity of the message, i.e. to ensure that the data has not been altered, e.g. during transmission from a sender to a receiver of the message. In manual authentication, short MAC values are used, i.e. tags having a length of less than 10-15 digits and/or characters and/or other symbols, thereby allowing a user to communicate and/or compare the tag values. In such a manual authentication scheme, the security is based on an unconditional security of the MAC function rather than on computational security. For example, if hash functions with long hash codes are used as MAC functions, the security is based on computational security.

The unconditional security of a MAC function may be determined by considering different types of possible attacks. Two main types of attacks that are typically considered are the impersonation attack and the substitution attack. In order to ease the understanding of the following description, these types of attacks will be briefly described here. For a more detailed description reference is made to e.g. G. Kabatianskii, B. Smeets and T Johansson, "On the cardinality of systematic A-codes via error correcting codes", IEEE Transaction on Information theory, vol. IT-42, pp. 566-578, 1996, which is incorporated herein in its entirety by reference.

In an impersonation attack, the attacker tries to convince a receiver that some data is sent from a legitimate sender without observing any prior data exchange between the legitimate sender and the receiver. In a substitution attack, on the other hand, the attacker first observes some data d and then replaces the observed data with some other data d'≠d. The probabilities for the attacker to succeed in an impersonation attack and a substitution attack are denoted $P_I$ and $P_S$, respectively, and they may be expressed as $$P_I = \max_{c \in C} P(c \text{ is valid}),$$

$$P_S = \max_{\substack{c,c' \in C \\ c \neq c'}} P(c' \text{ is valid} | c \text{ is observed}).$$

For example, in the context of the key exchange protocol described in connection with FIG. 7 below, the probability for an attacker to replace the observed data d with some other data d' is a relevant measure of the security of the key exchange method, i.e. the probability to replace a public key transmitted during the key exchange with another public key. In this scenario, the attacker succeeds, if d' is accepted by the receiver as valid data. In a short-range wireless communications scenario, such as Bluetooth, both devices are physically close to each other and may be restricted to only accept data, if both devices have signalled that they are ready. Hence, as in such a scenario the impersonation attack can easily be avoided, the probability of a substitution attack may be regarded as the more relevant measure of security. Furthermore, in many manual authentication scenarios, the tag value calculated by the MAC function is communicated over a separate communications channel different from the communications link over which the data is sent. This is in contrast to a standard MAC scenario, where both the data and the tag value are transmitted together and may be observed by an attacker. With these assumptions, the probability of a successful substitution attack may be expressed as $$P_S = \max_{\substack{d,d' \in D \\ d \neq d'}} P(f(d,k) = f(d',k) | d \text{ is observed}).$$

Thus, assuming that the key is chosen uniformly at random from the key space K, the above probability may be expressed as $$P_S = \max_{\substack{d,d' \in D \\ d \neq d'}} \frac{|\{k \in K : f(d,k) = f(d',k)\}|}{|K|},$$

where |·| the cardinality of a set, i.e. |K| is the cardinality of K and the numerator in the above equation is the cardinality of the set of all keys in the key space K yielding the same MAC function for both d and d'. Hence, it follows from the above equation that, in order to provide high security, the collision probability of the MAC function f should be low.

The following examples of MAC constructions are based on error correcting codes. For the purpose of this description error correcting codes over a finite field $F_q$ will be considered.

In particular, a q-ary code over $F_q$ with codewords of length n will be considered and denoted by V. In general, the code is a mapping from messages to codewords, such that each message corresponds to a unique codeword and each codeword comprises a number of symbols. Hence, the code V consists of all vectors $v \in V = \{v^{(d)} : d \in D\}$, where $v^{(d)} = (v_1^{(d)}, v_2^{(d)}, \ldots, v_n^{(d)})$, i.e. the $v_i^{(d)} \in F_q$ are the symbols of the codeword $v^{(d)}$.

The Hamming distance $d_H(x,y)$ between two q-ary n-tuples x and y is the number of components of the n-tuples that are not the same, i.e. $d_H(x,y) = |\{i \in \{1, \ldots, n\} : x_i \neq y_i\}|$. The minimum distance of a code V is $$d_H(V) = \min_{\substack{x,y \in V \\ x \neq y}} d_H(x,y),$$

i.e. the minimum distance between all codewords of the code V.

With reference to FIG. 3, an embodiment of a MAC construction based on error correcting codes will be described, i.e. FIG. 3 is a flow diagram of an embodiment of any of the sub-processes 106, 111, 205, 209, 714, of FIGS. 1, 2, and 7, respectively.

In an initial step 301, the input data to the MAC construction is provided, i.e. the message d to be authenticated and the key k to be used as input to the MAC function. In one embodiment, the key may be a string of symbols, digits, characters, or the like. Preferably, the key comprises less than 10-15 symbols, more preferably less than 7 symbols, e.g. 4-6 hexadecimal characters.

In step 302, an index $i \in \{1, \ldots, n\}$ is selected as a function g of the key k, i.e. i=g(k). In particular, if the key space K has n elements, i.e. |K|=n, each k may uniquely be mapped to one of the symbol indices and each index corresponds to one key. In one embodiment, the key is directly used as an index, i.e. i=k.

In step 303, the tag value t is determined as the i-th symbol of the codeword $v^{(d)}$ of the code V that correspond to the message d, i.e.

$$t = f(d,k) = v_i^{(d)} = v_{g(k)}^{(d)}.$$

Hence, the tag value is determined to be a selected symbol of the codeword of an error correcting code, where the codeword is the codeword corresponding to the message and the symbol is specified by the key. Consequently, in the above example, a MAC is obtained with a key space size equal to n and with a message space size equal to the coding space size. Furthermore, the above probability $P_S$ for a substitution attack is given by $$P_S = 1 - d_H(V)/n.$$

Figure 4A:
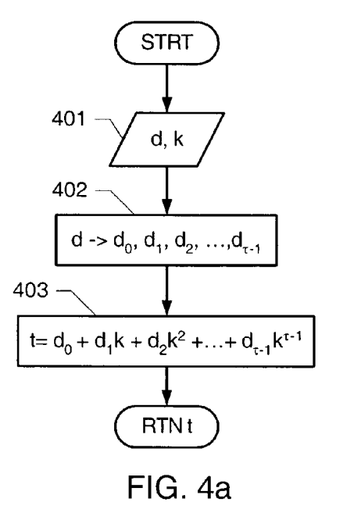

FIGS. 4a-b illustrate flow diagrams of examples of a method of calculating a message authentication code based on a Reed-Solomon code.

The term Reed-Solomon (RS) codes refers to a type of error correcting codes where the code words are defined via a polynomial division with a generator polynomial, see I. S. Reed and G. Solomon, "Polynomial Codes over Certain Finite Fields", journal of Soc. Ind. Appl. Math., vol. 8, pp. 300-304, 1960, which is incorporated herein in its entirety by reference. The term Reed-Solomon code is further intended to comprise variants of the Reed-Solomon code, e.g. so-called generalised Reed-Solomon codes.

In the construction of FIG. 4a, in an initial step 401, the input data to the MAC construction is provided, i.e. the message d to be authenticated and the key k to be used as input to the MAC function, as described in connection with FIG. 3 above.

In step 402, the message is expressed as a q-ary $\tau$-tuple over $F_q$, i.e. $d=d_0, d_1, \ldots, d_{\tau-1}$, where $d_i \epsilon F_q$. Hence, the Reed-Solomon (RS) encoding polynomial corresponding to the message is defined as $$p^{(d)}(x)=d_0+d_1x+d_2x^2+\ldots+d_{\tau-1}x^{\tau-1}.$$

In step 403, the tag value of the MAC is calculated by evaluating the polynomial at a point specified by the key k, i.e.

$$t=f(d,k)=v_k^{(d)}=p^{(d)}(k)=d_0+d_1k+d_2k^2+\ldots+d_{\tau-1}k^{\tau-1}.$$

Hence, the key k specifies a symbol of the Reed-Solomon code that is used as a tag value. It is understood that, as described above, the symbol may be specified by any suitable function of the key.

It is further noted that, in this construction, the key is selected from the finite field $F_q$, i.e. $k \epsilon F_q$. Consequently, this construction has the following properties: $n=q=|K|$ and $|D|=q^\tau=n^\tau$. The minimum distance of the above code is $d_H(V)= n-\tau+1$ and, thus, the probability of a successful substitution attack is $P_S=(\tau-1)/n$. It is an advantage of Reed-Solomon codes that they are long codes with a high minimum distance, thereby providing high security.

The above further implies that the probability $P_S$ increases with the size of the message space D.

FIG. 4b shows a flow diagram of another embodiment of a MAC construction based on a Reed-Solomon code.

Again, according to this construction, in an initial step 404, the input data to the MAC construction is provided, i.e. the message d to be authenticated and the key k to be used as input to the MAC function.

In step 405, a one-way hash function h is applied to the message. For the purpose of this description, the term one-way hash function refers to an algorithm that takes a data item, e.g. a string, as the input and produces a fixed-length binary value (hash) as the output. In particular, this process is irreversible, i.e. finding a data item that has produced a given hash value should be computationally unfeasible. Similarly it should further be computationally unfeasible to find two arbitrary data items that produce the same hash value. An example of a suitable hash function is the standard Secure Hash Algorithm SHA-1. The SHA-1 algorithm takes a message of less than 264 bits in length and produces a 160-bit message digest. Other examples of one-way hash functions include MD4, MD5, and the like. The output of the hash function $\delta=h(d)$ is then used as an input to the Reed-Solomon code. In one embodiment, the output of the hash function is truncated to further reduce the effective message size.

Hence, in step 406, the hash value $\delta$ expressed as a q-ary $\tau$-tuple over $F_q$, i.e. $\delta=\delta_0, \delta_1, \ldots, \delta_{\tau-1}$, where $\delta_i \epsilon F_q$.

In step 407, the tag value t of the MAC is calculated by evaluating the corresponding Reed-Solomon encoding polynomial at a point specified by the key k, i.e.

$$t=f(\delta,k)=v_k^{(\delta)}=p^{(\delta)}(k)=\delta_0+\delta_1k+\delta_2k^2+\ldots+\delta_{\tau-1}k^{\tau-1}.$$

Hence, by first applying a one-way hash function like SHA-1 to the message, the size of the message space is reduced, thereby reducing the probability $P_S$ of a successful substitution attack without considerably increasing the key length or the length of the output of the MAC, i.e. the length of the tag. Consequently, a secure authentication is provided even for short keys and short message tags, thereby allowing the communication of the key and the message tags via a human interaction.

Figure 5:
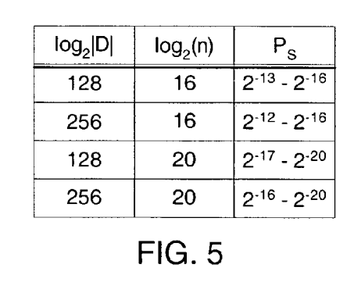
FIG. 5 shows a table illustrating the probabilities of a successful substitution attack-for a number of construction examples of the MAC construction of FIGS. 4a-b.

FIG. 5 shows a table illustrating the probabilities of a successful substitution attack for a number of construction examples of the MAC construction of FIGS. 4a-b. The first column designated $\log_2|D|$ comprises the size of the message as number of bits, the second column designated $\log_2(n)$ shows the key size in terms of the number of bits, while the last column shows the corresponding probability of a successful substitution attack. For example, a code having a code length of four hexadecimal digits and a key size of four digits ($n=q=16^4$, i.e. $\log_2(n)=16$) yields a forgery probability of around $2^{-13}$ to $2^{-16}$ for messages that are 128 bits long. Hence, a SHA-1 output truncated to 128 bits and a key size and code size of 4 hexadecimal bits yields a sufficiently high security. If the key size is increased to 5 digits ($\log_2(n)=20$), the probability decreases further to around $2^{-17}$ or less.

Figure 6:
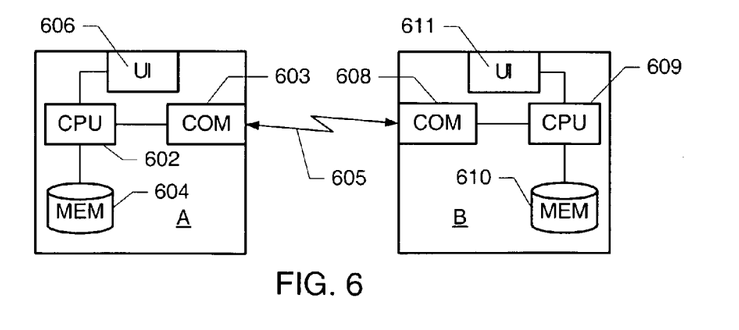
FIG. 6 shows a block diagram of two communications devices.

FIG. 6 shows a block diagram of a communications system including two communications devices generally designated A and B. The communications device A and the communications device B communicate with each other via a communications link 605.

The communications device A comprises a processing unit 602, a radio communications unit 603 connected to the processing unit, a storage medium 604 connected to the processing unit, and a user interface 606 connected to the processing unit.

The radio communications unit 603 transmits the data received from the processing unit 602 via the radio link 605 to the communications device 607, and it receives data from the radio link and forwards them to the processing unit. For example, the radio communications unit 603 may be based on the Bluetooth technology and transmit/receive in the ISM band at 2.45 GHz.

The processing unit 602, e.g. a suitably programmed microprocessor, processes the data received from other devices and the data to be sent to other devices according to the functionality implemented by the communications device A. In particular, the processing unit 602 is suitably programmed to perform the security functions described above, in particular the generation of a key and corresponding tag value of a MAC function as described above.

The storage medium 604, e.g. an EPROM, EEPROM, flash memory, or the like, is adapted to store the key k as well as the necessary parameters for the message authentication described above.

The user interface 606 comprises a display for displaying the generated key K and the corresponding tag value t, such that a user may read out the generated values and transfer them to the communications device B. Additionally, the user interface 606 may comprise data input means, such as a keyboard, a keypad, a pointing device, a touch screen, or the like.

The communications device B comprises a processing unit 609, a radio communications unit 608 connected to the processing unit, a storage medium 610 connected to the processing unit, and a user interface 611 connected to the processing unit.

The radio communications unit 609 corresponds to the radio communications unit 603 of communications device A, thereby allowing radio communication between the radio communications devices A and B.

The processing unit 609 processes the data received other devices and the data to be sent to other devices according to the functionality implemented by the communications device. In particular, the processing unit is suitably programmed to perform the security functions described above, in particular the authentication method described above and corresponding to the authentication mechanism implemented by device A.

Likewise, the storage medium 604, e.g. an EPROM, EEPROM, flash memory, or the like, is adapted to store the key k and the tag value t.

The user interface 611 comprises an input device, e.g. a keypad, a keyboard, a touch screen, or the like allowing a user to enter the key k and the corresponding tag value t generated by communications device A. Additionally, the user interface may comprise a display, a pointing device, and/or the like.

Hence, the communications system of FIG. 6 comprises two communications devices, e.g. two portable communications devices such as mobile telephones, a mobile telephone and a portable computer, two portable computers, or any combination of similar electronic equipment that are adapted to perform a message authentication according to the method described above.

In one embodiment, the processing units and/or the storage media may be removably inserted in the corresponding communications device, thereby allowing, the security association to be established independent of the actual device. For example the storage medium and/or processing unit may be constituted by a smart card, e.g. a SIM card.

It is further noted that the communications devices may comprise further components which have been omitted in the schematic block diagram of FIG. 6. For example, depending on the actual implementation of the authentication scheme, the devices may comprise further input and/or output means for inputting and/or outputting the parameters of the authentication method. For example, one of the devices may comprise a further communications interface, e.g. a network card, for retrieving the key and or tag value from a network server, or the like.

Figure 7:
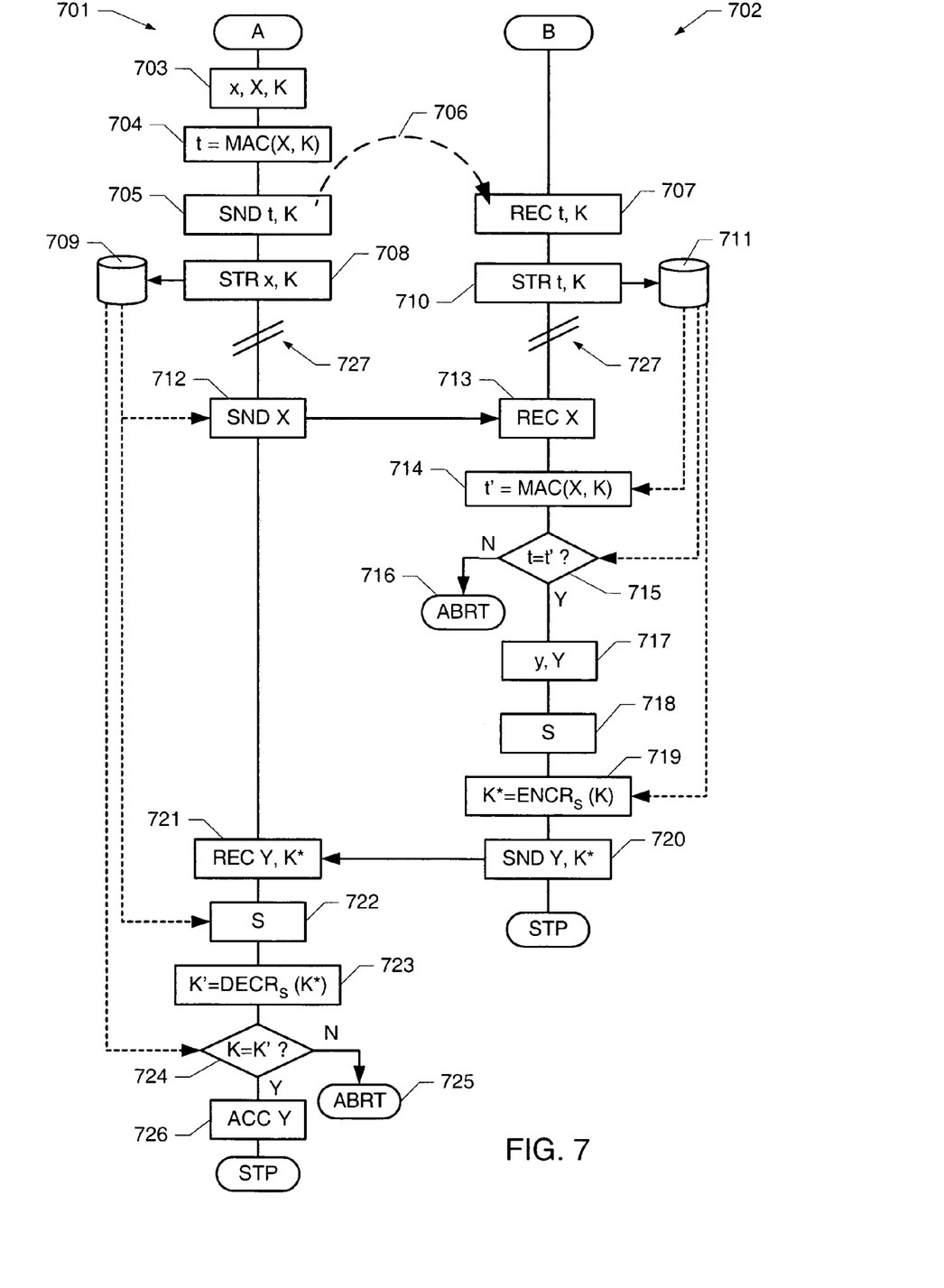
FIG. 7 illustrates an embodiment of a secure key exchange mechanism where a contribution to the generated shared secret is communicated via a wireless communications link and authenticated by the message authentication described in connection with FIGS. 3 and 4a-b.

FIG. 7 illustrates an embodiment of a secure key exchange mechanism where a contribution to the generated shared secret is communicated via a wireless communications link and authenticated by the message authentication described above. Hence, in this embodiment, the message is a contribution to a shared secret. When two devices, generally designated A and B, respectively, are intended to perform a secure key exchange in order to establish a shared secret key, they perform the following steps, where the steps on the left side of the flow diagram, generally designated by reference numeral 701, are performed by device A, while the steps on the right side of the flow diagram, generally designated by reference numeral 702, are performed by device B.

The following key exchange is based on the so-called "Diffie-Hellman" method for key agreement. In order to ease understanding of the following description, the Diffie-Hellman key agreement will be briefly described. For a more detailed description reference is made to U.S. Pat. No. 4,200,770, which is included herein in its entirety by reference.

When two devices A and B wish to establish a shared secret key, they agree on a prime number p>2 and a base g, which is a primitive mod p. The parameters p and g may be hard-coded into both devices, they may be generated by one of the devices and communicated to the other device, they may be retrieved from a third party, or the like. For example, in order to generate p and g, a value of p may be selected, for example as a large random number, e.g. comprising 1000 bits or more, and a known prime test may be performed in order to test whether p is a prime number. If not, a new p may be selected and tested until a prime number is found. Subsequently, a random number g is selected and it is tested whether g is a generator; if not, a new g is selected and tested until a generator is found.

Each device generates a secret number which is less than p−1. In the following, the secret number generated by device A will be called x, and the secret number generated by device B will be called y. Each device then generates a public key based on the secret value and the above parameters: Device A generates $X = g^x \mod p$, where mod designates the modulus function, i.e. the remainder of an integer division. Similarly, device B generates $Y = g^y \mod p$.

The devices exchange their public keys, and each device calculates a common secret value S according to:

Device A: $S = (Y)^x \mod p$,

Device B: $S = (X)^y \mod p$.

Hence, as a result, the devices A and B have established a common secret key S without having communicated the secret values x and y, since $(g^y \mod p)^x \mod p = (g^x \mod p)^y \mod p$.

Now referring to FIG. 7, in an initial step 703 of the key exchange, device A generates a random number x, a corresponding Diffie-Hellman public key X, and a short secret string K. The Diffie-Hellman public key X is calculated as described above based on corresponding parameters g and p, which have been agreed upon by the devices A and B. Preferably, the secret string K is determined randomly from a suitable key space, e.g. as a string of 4-6 hexadecimal digits.

In subsequent step 704, device A uses a message authentication code (MAC) as described above to calculate a tag value t from the public key X using the secret string K as a key. It is understood that, in some embodiments, where additional data is communicated during the key establishment, the tag value may be calculated from a message including the public key X and the additional data, thereby providing integrity protection for the additional data as well.

In step 705, the generated secret string K and the calculated tag value t are communicated to device B via a suitable communications channel, as indicated by the dashed arrow 706 in FIG. 7. For example, the values of K and t may be transferred from device A to device B by a user interaction, e.g. by reading out the values from a display of device A and by keying in the values into device B. In another embodiment, the values may be transferred by some other means, e.g. via a telecommunications network, by sending the values as an encrypted message, e.g. an e-mail, an SMS, or the like, or via any other suitable communications channel, preferably a communications channel different from the communications channel for which the secure communications is to be established. It is an advantage that the devices A and B do not have to have a communications link established with each other; they do not even have to be in the proximity of each other. For example, the user of device A may communicate the secret string and the tag value to the user of device B by phone, mail, or any other suitable means. Furthermore, the communication of the generated values of K and t may be performed in advance of the time at which the shared secret key is actually to be established between the devices, e.g. as part of a registration procedure. In one embodiment, an identifier ID is communicated together with K and t in order to facilitate subsequent retrieval of K and t.

In step 707, device B receives the values of K and t and, in step 710, stores them in a storage medium 711 of device B, e.g. an EPROM or EEPROM of a portable device, on a smart card, on a hard disk or any other suitable data storage device. If the values K and t are related to an identifier ID, the values K and t are stored in relation to that identifier, e.g. using the identifier as an index.

Similarly, in step 708 device A stores the secret string K, optionally in relation to the identifier ID, in a storage medium 709 of device A. Furthermore, device A stores the secret value x, upon which the calculation of the public key X was based.

This concludes the initial registration process. The following steps including the actual key exchange are performed when the devices A and B are actually connected via a communications link. This may be immediately after the above initial registration or at a later point in time, as indicated by the lines 727 in FIG. 7.

In step 712, device A initiates the actual key exchange by transmitting the public key X to device B via a wireless communications link. In an embodiment where the secret string K was related to an identifier ID, device A also transmits that identifier. Likewise, if, in step 704, the tag value t was calculated for the public key and some additional data, that additional data is also send from device A to device B.

When device B receives the public key X from device A (step 713), in step 714 device B retrieves the secret string K from the storage medium 711, in one embodiment based on the identifier ID. Device B calculates the MAC tag value t' of the received public key X and based on the secret string K.

In step 715, device B compares the calculated tag value t' with the previously stored tag value t. If the tag values are different, the received public key is rejected (step 716). For example, device B may abort the key exchange by sending a corresponding message to device A and/or by informing the user about the rejection, e.g. by providing a visual or audible indication. Otherwise, i.e. if the tag values are equal, the public key X is accepted and the process continues at step 717.

In step 717, device B generates a secret value y and a corresponding Diffie-Hellman public key Y, as described above.

In step 718, device B generates the corresponding Diffie-Hellman shared secret key $S=(X)^y \bmod p$.

In step 719, device B encrypts the secret string K retrieved from the storage medium 711 using the generated shared secret key S resulting in an encrypted secret string K*. The encryption may be based on any suitable encryption method based on a symmetric secret key.

In step 720, device B sends the encrypted string K* and the Diffie-Hellman public key Y to device A. Again, in one embodiment device B further sends the corresponding identifier ID.

In step 721, device A receives the encrypted string K* and the Diffie-Hellman public key Y.

In step 722, device A generates the Diffie-Hellman shared secret key $s=(Y)^x \bmod p$ using the secret value x stored in storage medium 709.

In step 723, device A uses the generated shared secret key S to decrypt the received encrypted secret string K* to obtain the decrypted secret string K'.

In step 724, device A compares the received and decrypted secret string K' with the secret string K originally generated by device A and stored in storage medium 709. If the secret strings are not equal, the received public key Y is rejected, i.e. the generated shared secret key S is discarded (step 725). Otherwise the process continues at step 726.

In step 726, the received public key Y is accepted, i.e. the calculated shared secret key S is accepted as a shared secret. In one embodiment, a corresponding message is sent to device, thereby completing the key exchange. The generated shared secret key may now be used to protect the subsequent communication between the devices A and B, e.g. by encrypting and/or integrity protecting the messages sent between the devices.

It is understood that, in an alternative embodiment, the public key Y communicated from device B to device A may be authenticated by a different method, e.g. by calculating a MAC according to the method described above.

It is understood that the authentication method described herein may also be used to authenticate a previously established shared secret, e.g. a shared secret generated by an anonymous Diffie-Hellman key agreement. Hence, in this embodiment, the message is a shared secret, cooperatively generated by two devices.

It should be emphasized that the term "comprises/comprising" when used in this specification is taken to specify the presence of stated features, integers, steps or components but does not preclude the presence or addition of one or more other features, integers, steps, components or groups thereof.

Although preferred embodiments of the present invention have been described and shown, the invention is not restricted to them, but may also be embodied in other ways within the scope of the subject matter defined in the following claims.

The mere fact that certain measures are recited in mutually different dependent claims does not indicate that a combination of these measures cannot be used to advantage.

That which is claimed is:

1. A method of processing a message to determine a tag value from the message and from a key according to a message authentication code, the method comprising:
    selecting one of a plurality of symbols, the plurality of symbols forming a codeword encoding a data item derived from the message, wherein the data item is derived from the message consists of said message, the codeword encoding the data item according to an error correcting code, wherein said key determines which one of said plurality of symbols is selected;
    determining the tag value to be the selected symbol;
    determining said data item to be a hash value of a one-way hash function calculated from the message:
    communicating at least a contribution to the message from a sender to a receiver via a first communications channel; and
    communicating the tag value and/or the key from the sender to the receiver via a second communications channel different from the first communications channel.

2. A method according to claim 1, wherein the key is short enough to be communicated via a user interaction.

3. A method according to claim 1, wherein the error correcting code is a Reed-Solomon code and wherein the tag value is determined by evaluating a Reed-Solomon encoding polynomial at a point determined by the key.

4. A method according to claim 1, wherein the tag value is an element in a finite field.

5. A method according to claim 1, wherein the second communications channel includes a user interaction.

6. A communications device for communicating data messages, the communications device comprising:
    a transmitting/receiving circuitry operable on a first communication channel operable to transceive at least a contribution to a message via the first communications channel;
    a transmitting/receiving circuitry operable on a second communication channel operable to transceive a tag value and a key via the second communications channel;
    a processor operable to determine the tag value from the message and from the key according to a message authentication code, and wherein the processor is further operable to select one of a plurality of symbols, the plurality of symbols forming a codeword encoding a data item derived from the message, the codeword encoding the data item according to an error correcting code, wherein said key determines which one of said plurality of symbols is selected, and wherein the processing means is further adapted to determine the tag value to be the selected symbol.

7. A computer program product embodied on a computer readable medium loaded into a memory and executed by a processor comprising:

instructions to control a transmitting/receiving circuitry operable on a first communication channel to transceive at least a contribution to a message via the first communications channel and a transmitting/receiving circuitry operable on a second communication channel operable to transceive a tag value and a key via the second communications channel:

instructions causing the processor to determine a tag value from a message and from a key according to a message authentication code, further comprising:

instructions causing the processor to select one of a plurality of symbols, the plurality of symbols forming a codeword encoding a data item derived from the message, the codeword encoding the data item according to an error correcting code, wherein said key determines which one of said plurality of symbols is selected; and instructions causing the processor to determine the tag value to be the selected symbol.

8. A computer program product embodied on a computer readable medium loaded into a memory and executed by a processor comprising:

instructions to cause the processor to communicate data messages over a first communications channel;

instructions to cause the processor to determine a tag value from a message and from a key according to a message authentication code sent over a second communications channel;

instructions to cause the processor to select one of a plurality of symbols, the plurality of symbols forming a codeword encoding a data item derived from the message, the codeword encoding the data item according to an error correcting code, wherein said key determines which one of said plurality of symbols is selected; and instructions to cause the processor to determine the tag value to be the selected symbol.

9. A communications device for communicating data messages, the communications device comprising:

a receiving circuitry operable on a first communication channel operable to receive at least a contribution to a message via the first communications channel;

a receiving circuitry operable on a second communication channel operable to receive a tag value and a key via the second communications channel;

a processing unit operable to determine the tag value from a message and from the key according to a message authentication code, and wherein the processing unit is adapted to select one of a plurality of symbols, the plurality of symbols forming a codeword encoding a data item derived from the message, the codeword encoding the data item according to an error correcting code, wherein said key determines which one of said plurality of symbols is selected, and wherein the processing unit is adapted to determine the tag value to be the selected symbol.

* * * * *

UNITED STATES PATENT AND TRADEMARK OFFICE
CERTIFICATE OF CORRECTION

| | | |
|---|---|---|
| PATENT NO. | : 7,702,910 B2 | Page 1 of 1 |
| APPLICATION NO. | : 10/602167 | |
| DATED | : April 20, 2010 | |
| INVENTOR(S) | : Christian Gehrmann | |

It is certified that error appears in the above-identified patent and that said Letters Patent is hereby corrected as shown below:

On the title page on page 2, in item (56), under "OTHER PUBLICATIONS", in Column 1, Line 4, delete "Techinical" and insert -- Technical --, therefor.

In Column 6, Line 44, delete "message. e" and insert -- message. --, therefor.

In Column 14, Line 34, in Claim 1, delete "message:" and insert -- message; --, therefor.

In Column 15, Line 15, in Claim 7, delete "channel:" and insert -- channel; --, therefor.

Signed and Sealed this

Twenty-second Day of June, 2010

David J. Kappos
*Director of the United States Patent and Trademark Office*